(12) United States Patent
DiFrancesco et al.

(10) Patent No.: US 8,502,909 B2
(45) Date of Patent: Aug. 6, 2013

(54) SUPER LIGHT-FIELD LENS

(75) Inventors: David DiFrancesco, Point Richmond, CA (US); Thomas Douglas Selkirk Duff, Berkeley, CA (US); Mark VandeWettering, El Sobrante, CA (US); Peter Flowers, Milton, MA (US)

(73) Assignee: Pixar, Emeryville, CA (US)

( * ) Notice: Subject to any disclaimer, the term of this patent is extended or adjusted under 35 U.S.C. 154(b) by 247 days.

(21) Appl. No.: 12/717,842

(22) Filed: Mar. 4, 2010

(65) Prior Publication Data
US 2011/0169994 A1    Jul. 14, 2011

Related U.S. Application Data

(60) Provisional application No. 61/252,996, filed on Oct. 19, 2009.

(51) Int. Cl.
*H04N 5/225* (2006.01)

(52) U.S. Cl.
USPC ............................. 348/340; 348/46; 348/335

(58) Field of Classification Search
USPC .......................................... 348/46, 335, 340
See application file for complete search history.

(56) References Cited

U.S. PATENT DOCUMENTS

| 6,621,065 | B1 * | 9/2003 | Fukumoto et al. | 250/216 |
| 2004/0239876 | A1 * | 12/2004 | Levine | 351/206 |
| 2005/0185819 | A1 * | 8/2005 | Delp et al. | 382/100 |
| 2009/0096865 | A1 | 4/2009 | McKinley | |
| 2009/0185801 | A1 * | 7/2009 | Georgiev et al. | 396/332 |
| 2009/0262182 | A1 * | 10/2009 | Javidi et al. | 348/46 |

OTHER PUBLICATIONS

Adelson and Wang, "Single Lens Stereo with a Plenoptic Camera", IEEE Transactions of Pattern Analysis and Machine Intelligence, vol. 14, No. 2, Feb. 1992.*
Ng et al., "Light Field Photography with a Hand-held Plenoptic Camera", Stanford Tech Report CTSR Feb. 2005.*
Bishop, T.E. et al., "The Light Camera: Extended Depth of Field, Aliasing and Super-resolution," *IEEE Transaction of Pattern Recognition and Machine Intelligence*—Draft, Mar. 24, 2010, pp. 1-34, 2 pages of publication information.
NG, R. et al., "Light Field Photography with a Hand-held Plenoptic Camera," *Stanford Tech Report CTSR 2005-02*, Apr. 2005, pp. 1-11.

* cited by examiner

*Primary Examiner* — Roberto Velez
*Assistant Examiner* — Yih-Sien Kao
(74) *Attorney, Agent, or Firm* — Kilpatrick Townsend & Stockton LLP

(57) ABSTRACT

Light field imaging systems, and in particular light field lenses that can be mated with a variety of conventional cameras (e.g., digital or photographic/film, image and video/movie cameras) to create light field imaging systems. Light field data collected by these light field imaging systems can then be used to produce 2D images, right eye/left eye 3D images, to refocus foreground images and/or background images together or separately (depth of field adjustments), and to move the camera angle, as well as to render and manipulate images using a computer graphics rendering engine and compositing tools.

18 Claims, 20 Drawing Sheets
(1 of 20 Drawing Sheet(s) Filed in Color)

Super Plenoptic Lens with Vista Vision Camera

Super Plenoptic Lens with RedOne Camera

Fig. 12

| focal length | full angle of view | image circle diameter | vertical "area" covered | horizontal "area" covered | diagonal "area" covered | image circle / diagonal "area" covered | max mag | fractional error | image distance at max mag | delta image distance from infinity | delta image distance / focal length |
|---|---|---|---|---|---|---|---|---|---|---|---|
| mm | degrees | mm | mm | mm | mm | | | | mm | mm | |
| 50 | 82 | 86.93 | 63 | 78 | 100.3 | 0.87 | 0.88 | 0.015 | 94 | 44 | 0.88 |
| 65 | 68 | 87.69 | 80 | 100 | 128.1 | 0.68 | 0.70 | 0.022 | 110.5 | 45.5 | 0.7 |
| 90 | 53 | 89.74 | 110 | 136 | 174.9 | 0.51 | 0.51 | 0.006 | 135.9 | 45.9 | 0.51 |
| 110 | 44 | 88.89 | 135 | 167 | 214.7 | 0.41 | 0.42 | 0.014 | 156.2 | 46.2 | 0.42 |
| 150 | 33 | 88.86 | 183 | 227 | 291.6 | 0.30 | 0.31 | 0.017 | 196.5 | 46.5 | 0.31 |
| 180 | 28 | 89.76 | 217 | 270 | 346.4 | 0.26 | 0.26 | 0.003 | 226.8 | 46.8 | 0.26 |
| 250 | 20 | 88.16 | 297 | 369 | 473.7 | 0.19 | 0.19 | 0.020 | 297.5 | 47.5 | 0.19 |
| 500 | 10 | 87.49 | 597 | 740 | 950.8 | 0.09 | 0.09 | 0.022 | 545 | 45 | 0.09 |

The data in columns A, B, C, D, E, and I are directly from the Mamiya data sheets.
The data in column F is the diagonal of the "covered" rectangle The data in columns H, I, and J shows the relationship between; the "area covered", the image circle, and the max mag.

The data in column L shows the the image distance change from focus at infinity to closest object distance is about 45 mm.
The "fixed" image distance change inplies the lens travel over the full focal range is about 45 mm for all of the lenses I've listed.
Now there is enough information to figure out the full range of behavior for the Lenslet "reimaging". for the Mamiya lenses.

| aspect ratio | 1.33 | | | | | LENSLETS ON HORIZONTAL EDGE | | | | | |
|---|---|---|---|---|---|---|---|---|---|---|---|
| | | | | | | | | | | Edmund 142/inch 179 | Edmund 64/inch 400 |
| image circle diameter (mm) | frame horizontal (mm) | frame vertical (mm) | 50 (microns) | 75 (microns) | 100 (microns) | Stanford 125 (microns) | Pixar 161 (microns) | | | (microns) | (microns) |
| 5 | 4.00 | 3.00 | 80 | 53 | 40 | 32 | 25 | | | 22 | 10 |
| 10 | 7.99 | 6.01 | 160 | 107 | 80 | 64 | 50 | | | 45 | 20 |
| 15 | 11.00 | 9.01 | 240 | 160 | 120 | 96 | 74 | | | 67 | 30 |
| 20 | 15.99 | 12.02 | 320 | 213 | 160 | 128 | 99 | | | 89 | 40 |
| 25 | 19.99 | 15.02 | 400 | 266 | 200 | 160 | 124 | | | 112 | 50 |
| 30 | 23.08 | 18.03 | 480 | 320 | 240 | 192 | 149 | | | 134 | 60 |
| 35 | 27.97 | 21.03 | 559 | 373 | 280 | 224 | 174 | | | 156 | 70 |
| 40 | 31.97 | 24.04 | 639 | 426 | 320 | 256 | 199 | | | 179 | 80 |
| 45 | 35.97 | 27.04 | 719 | 480 | 360 | 288 | 223 | | | 201 | 90 |
| 50 | 39.96 | 30.05 | 799 | 533 | 400 | 320 | 248 | | | 223 | 100 |
| 55 | 43.96 | 33.05 | 879 | 586 | 440 | 352 | 173 | | | 246 | 110 |
| 60 | 47.96 | 36.06 | 959 | 639 | 480 | 384 | 298 | | | 268 | 120 |
| 65 | 51.95 | 39.06 | 1039 | 693 | 520 | 416 | 323 | | | 290 | 130 |
| 70 | 55.95 | 42.07 | 1119 | 748 | 559 | 448 | 348 | | | 313 | 140 |
| 75 | 59.95 | 45.07 | 1199 | 799 | 599 | 480 | 372 | | | 335 | 150 |
| 80 | 63.94 | 48.08 | 1279 | 853 | 639 | 512 | 397 | | | 357 | 160 |
| 85 | 67.94 | 51.08 | 1359 | 906 | 679 | 544 | 422 | | | 380 | 170 |
| 90 | 71.94 | 54.09 | 1439 | 959 | 719 | 576 | 447 | | | 402 | 180 |

FIG. 13

LENSLETS / FRAME

| 50 (microns) | 75 (microns) | 100 (microns) | Stanford 125 (microns) | Pixar 161 (microns) | 175 (microns) | 200 (microns) |
|---|---|---|---|---|---|---|
| 4803 | 2135 | 1201 | 769 | 463 | 392 | 300 |
| 19213 | 8539 | 4803 | 3074 | 1853 | 1568 | 1201 |
| 43230 | 10213 | 10808 | 6017 | 4160 | 3529 | 2702 |
| 76854 | 34157 | 19213 | 12297 | 7412 | 6274 | 4803 |
| 120084 | 53371 | 30021 | 19219 | 11582 | 9803 | 7505 |
| 172921 | 76854 | 43230 | 27667 | 16678 | 14116 | 10808 |
| 236364 | 104606 | 58841 | 37858 | 22700 | 18213 | 14710 |
| 307414 | 136529 | 76854 | 49185 | 29649 | 25095 | 19213 |
| 389071 | 172921 | 97268 | 62251 | 37525 | 31761 | 24317 |
| 480335 | 213482 | 120084 | 76854 | 46327 | 39211 | 30021 |
| 581205 | 258314 | 145301 | 92993 | 56055 | 47445 | 36325 |
| 691683 | 307414 | 172921 | 110869 | 66711 | 56464 | 43230 |
| 811766 | 380785 | 202942 | 129883 | 78292 | 66287 | 50735 |
| 941457 | 418425 | 235364 | 150833 | 90801 | 76854 | 58841 |
| 1080754 | 480335 | 270189 | 172921 | 104235 | 88225 | 67547 |
| 1229658 | 548515 | 307414 | 198745 | 118597 | 100380 | 76854 |
| 1385189 | 616964 | 347042 | 222107 | 133885 | 113320 | 86781 |
| 1556286 | 691683 | 389971 | 249006 | 150000 | 127044 | 97268 |

FIG. 13
*(Continued)*

| Current MP Lens | | Equivalent Focal Length Prime Lens for Super Plenoptic Lens | | | | | |
|---|---|---|---|---|---|---|---|
| Zeiss Master Prime | | Prime Lens #1 | | | Prime Lens #2 | | |
| Focal Length | FOV | Focal Length | FOV | Image Circle | Focal Length | FOV | Image Circle |
| 18mm | 70° | | | | AF 45mm f2.8 | 74° | 67.4mm |
| 25mm | 53° | | | | LS 80mm f2.8 | 47° | 67.4mm |
| 35mm | 38° | 110mm f2.8 | 44° | 93.3° | LS 110mm f2.8 | 44° | 67.4mm |
| 50mm | 28.2° | | | | AF 150mm f2.8 | 26° | 67.4mm |
| 65mm | 16.6° | 350mm f5.6 | 15° | 93.3mm | | | |
| 100mm | 12.6° | 500mm f6 | 10° | 93.3mm | | | |

*FIG. 14*

SUPER LIGHT-FIELD LENS

CROSS-REFERENCES TO RELATED APPLICATIONS

This application claims the benefit of U.S. Provisional Application Ser. No. 61/252,996, filed Oct. 19, 2009, entitled "Super Light Field Lens," which is hereby incorporated by reference in its entirety for all purposes.

BACKGROUND

The present invention relates generally to optical systems, and more particularly to light field imaging systems or plenoptic imaging systems.

In prior light field gathering, or plenoptic imaging systems, a prime lens typically focuses light onto a lenslet array positioned close to the focal plane of the prime lens. The lenslet array includes a plurality of microlenses that each refracts light to thereby form a plurality of microlens images that are collected by a sensor located proximal the focal plane of the microlenses. Typically this distance to the sensor is on the order of a couple to a few millimeters (mm) from the lenslet array as determined by the aperture and f# of the microlenses. Hence, prior systems were constrained as they could not be used with cameras which typically require a minimum lens clearance of about 30 to 40 mm, which far exceeds the 3 or 4 mm clearance provided by the lenslet array. Further, adapting cameras to work with such a plenoptic imaging system can be a costly and onerous solution.

Therefore it is desirable to provide systems and lenses that overcome the above and other problems, including lens systems that mate with cameras.

BRIEF SUMMARY

The present invention provides light field imaging systems, and in particular light field lenses that can be mated with a variety of conventional cameras (e.g., digital or photographic/film, image and video/movie cameras, and DSLR cameras) to create light field imaging systems. Light field data collected by these light field imaging systems can then be used to produce 2-dimensional (2D) images, right eye/left eye 3D images, to refocus foreground images and/or background images together or separately (depth of field adjustments), and to move the camera angle, to name a few examples. The data can also be used to render and manipulate images using a computer graphics rendering engine such as RenderMan® RenderMan for example in a post production process.

In one embodiment, a light field imaging system includes a field lens, a lenslet array positioned proximal the focal plane of the prime lens and a relay optical element configured to gather the light field refracted by the lenslet array, to collimate the light field and to focus the light field onto an image plane. A sensor, such as a CCD sensor, a CMOS sensor or photographic film may be located proximal the image plane to capture resulting images.

In one embodiment, a super plenoptic lens is provided that includes a field lens and a lenslet array positioned proximal the focal plane of the field lens. The lens also includes relay optical elements configured and arranged to collimate and focus light refracted by the lenslet array onto an image plane. A sensor, such as a CCD sensor, a CMOS sensor or photographic film may be located proximal the image plane to capture resulting images.

In certain aspects, a field lens can include a prime lens (or any other fixed focal length lens) or a zoom lens.

In one embodiment, a method of calibrating a superplenoptic lens having a lenslet array is provided. The method typically includes obtaining a field image including a plurality of images each lenslet image corresponding to a lenslet in the lenslet array, filtering the field image, identifying a plurality of extrema in the filtered image, and using the extrema to determine locations and spacings of the lenslet images. The extrema may be maxima, e.g., peaks, or minima. In certain aspects, filtering the field image includes performing an autocorrelation.

Various embodiments described herein advantageously allow for the lens to gather the light field rather than a camera or sensor. Lenses according to various embodiments can be configured with appropriate optical manipulation characteristics and physical dimensions to allow for coupling with a variety of cameras.

In certain aspects, the system has a small form factor to facilitate portable use. For example, the system could attach to the back of a camera rig and the camera and data system could both rest on an operator's shoulder. The data system in certain aspects is configured to operate using internal battery power, but could also operate using a connection to an external power source.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5 illustrates two pictures of a lens according to one embodiment.

FIG. 12 illustrates image circle metadata for a superplenoptic lens as shown in FIG. 7.

FIG. 14 shows data for various motion picture prime lenses.

DETAILED DESCRIPTION

Figure 1A:
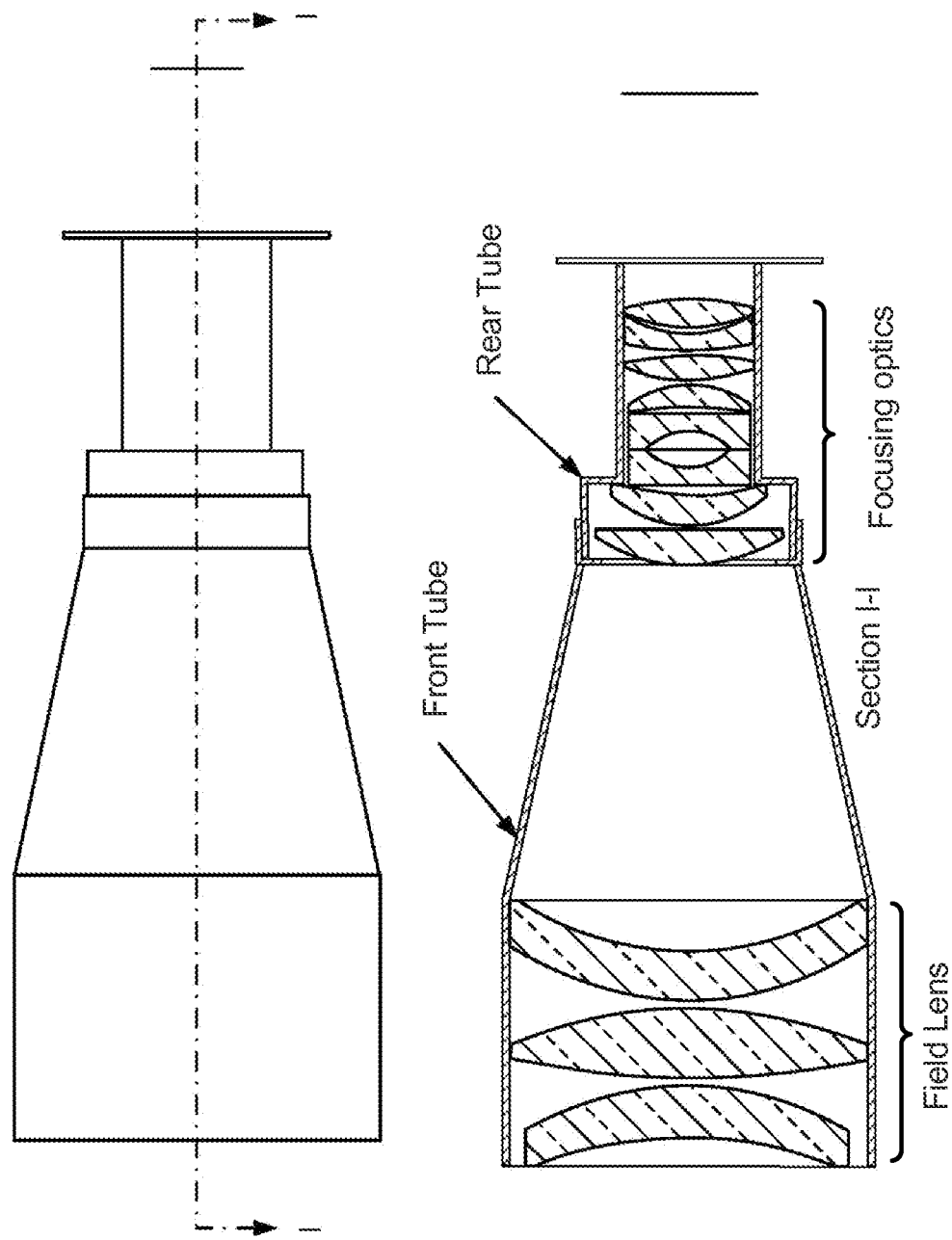
FIGS. 1a and 1b illustrate a relay element according to one embodiment.
Figure 1B:
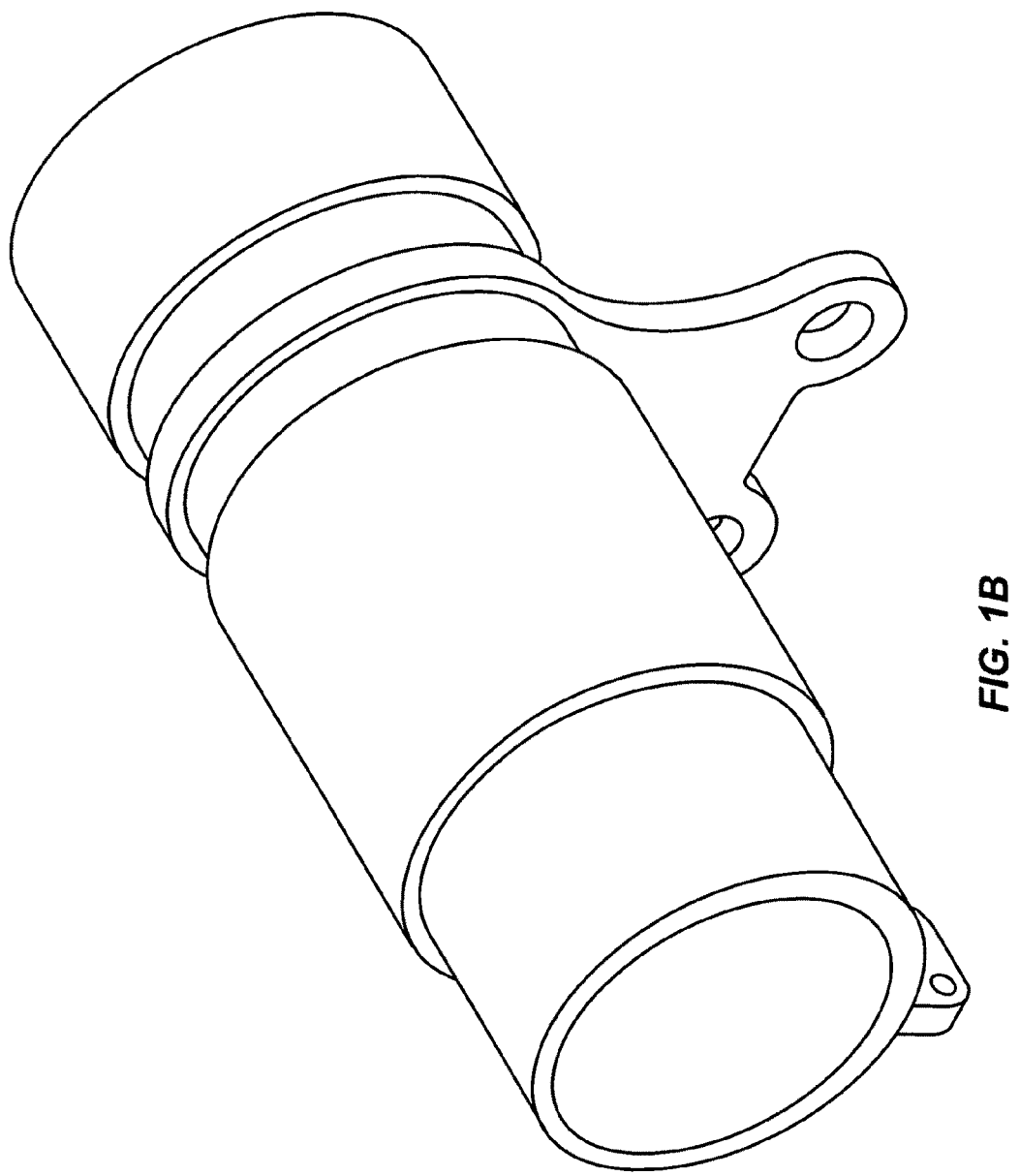
Figure 2:
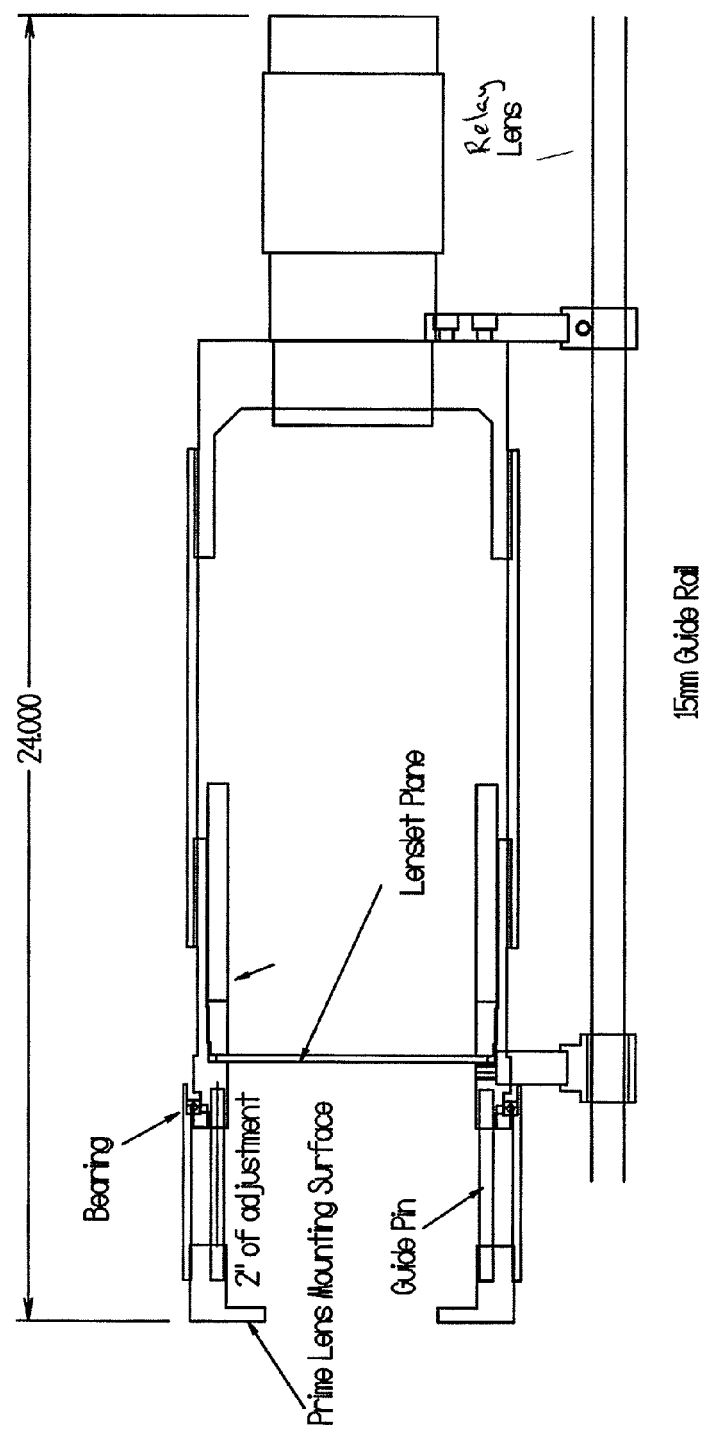
FIG. 2 is a side view of a more detailed example of a housing structure (e.g., lens barrel), including elements (e.g., threads, bearings) to allow for manipulation and adjustment of spacings of optical elements according to one embodiment.

FIGS. 1a and 1b illustrate a relay element according to one embodiment. As shown in FIG. 1a, a first set of optical elements in the front tube (a field lens, such as a lens with a fixed focal length) receives light refracted by the lenslet array (not shown) and collimates and focuses that light onto a second set of optical elements in the rear tube, which focus the light onto an image plane (not shown). A sensor, e.g., CCD, CMOS or film, positioned at the image plane receives and records image (s). FIG. 1b shows a perspective view of an example of a housing structure (e.g., lens barrel), with the relay lens on the left side In certain aspects, the field lens, the lenslet array and relay optical elements are contained within a housing structure (e.g., lens barrel) that allows for adaption of distance between the various elements, e.g., by manual rotation or manipulation, or by electronic control via a controller subsystem. FIG. 2 is a side view of a more detailed example of a housing structure (e.g., lens barrel), including elements (e.g., threads, bearings) to allow for manipulation and adjustment of spacings of optical elements according to one embodiment. In certain aspects, the various optical elements are contained within a housing structure at fixed distances.

Figure 3:
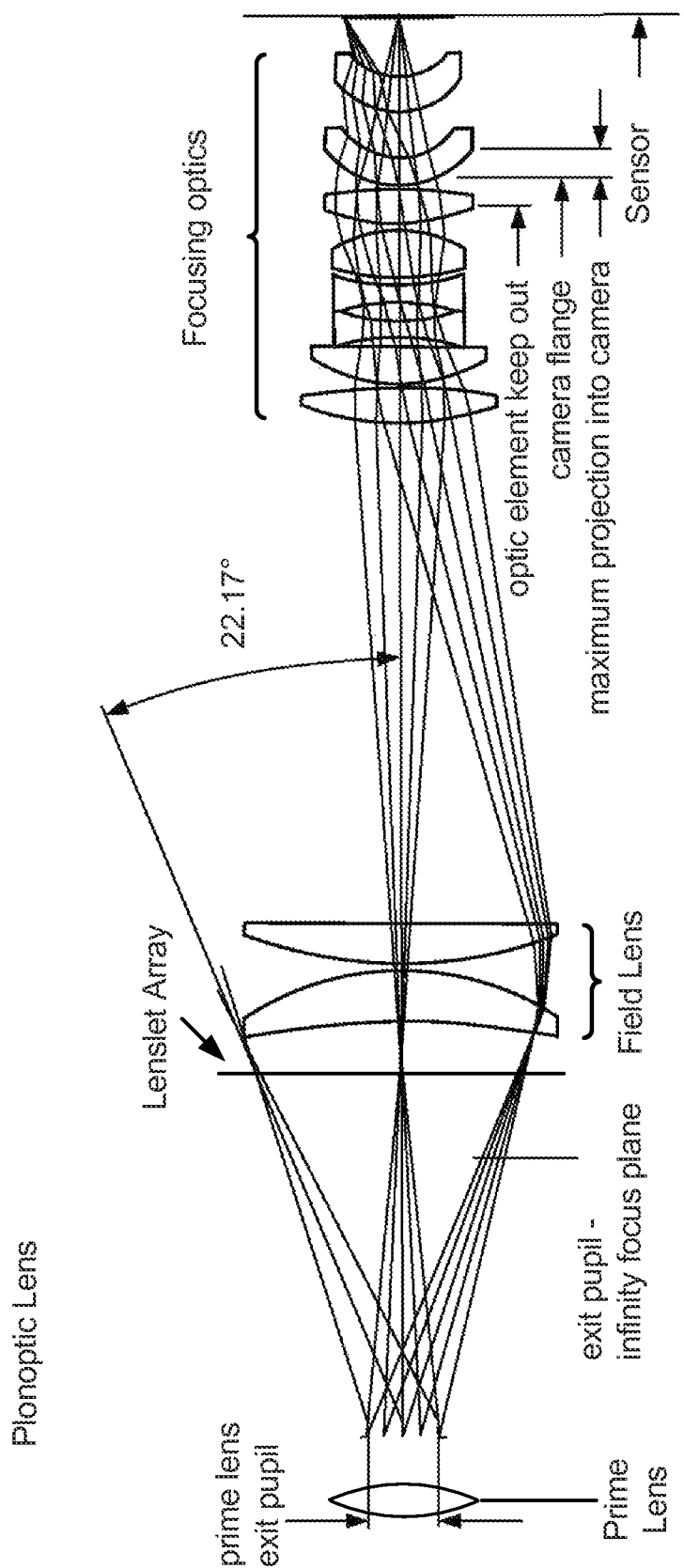
FIG. 3 is an example of optical elements for a specific light field imaging system according to one embodiment.

FIG. 3 is an example of optical elements for a specific light field imaging system according to one embodiment. It should be understood that the dimensions and specific elements may be changed as would be apparent to one skilled in the art based on the teachings herein. Light is focused by the prime lens onto a focus plane (approximately 45 mm-108.5 mm from the prime lens in this example). A prime lens can include a fixed focal length lens or a zoom lens. A lenslet array positioned proximal the focus plane refracts the light into a plurality of images. The light refracted by the lenslet array is collected, collimated and focused by the first set of optical elements onto a second set of optical elements as shown. The second set of optical elements is configured and arranged to focus that light onto an image plane as shown. Again, a sensor located proximal the image plane collects image data (e.g., digital data in the case of CCD or CMOS sensors, or images in the case of film). In the example shown, the image plane is approximately 240 mm-300 mm from the lenslet array/focal plane of the prime. In certain aspects, with appropriate selection and/or adjustment of elements in the relay lens, the distance between the image plane and the lenslet array can be set at, or adjusted to be, from about 30 mm to about 300 mm or greater.

Figure 6:
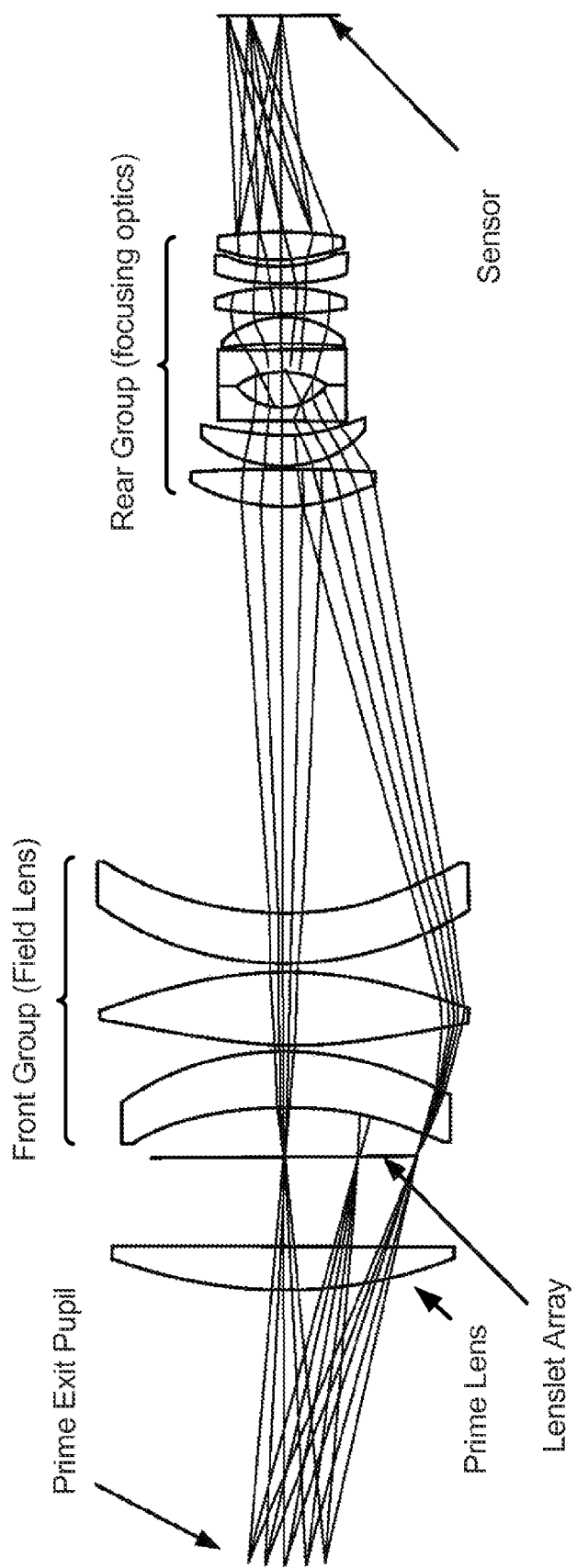
FIGS. 6 and 7 illustrate examples of relay lenses having specific arrangements of optical elements according to certain embodiments.
Figure 7:
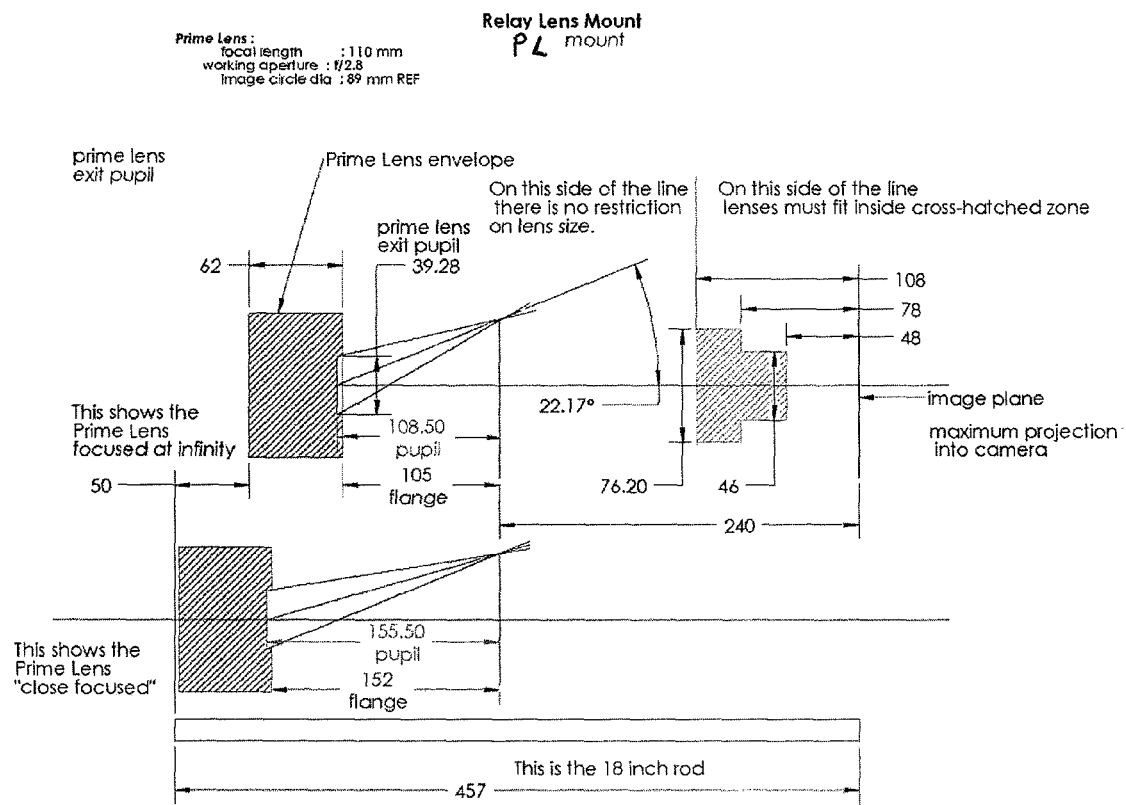

FIGS. 6 and 7 illustrate examples of relay lenses having specific arrangements of optical elements according to certain embodiments.

In certain aspects, it is desirable that the f# of the prime lens match the f# of the lenslet array to allow for better image separation at the lenslet array. In certain aspects, the f# of the prime lens should be the same as or larger than the f# of the lenslet array. For example, a prime having f/2.8 or f/4 would work well with a lenslet array having f/2.8, or f/4, respectively.

In certain aspects, it is desirable to take the output of the light field image system and process the image data, e.g., to convert it to different formats for post processing functions such as depth map formats for compositing, manipulating and rendering 2D images, to produce right eye/left eye 3D images, to refocus foreground images and/or background images together or separately (depth of field adjustment), and to move the camera angle, etc. According to one embodiment, a process for such a pipeline begins with camera data acquisition (e.g., acquire raw image files), then camera calibration (e.g., process and store calibrated light fields) and then light field rendering (e.g., to produce DPX, TIFF or zmap files or other file types). For digital sensors, an interface with a storage subsystem or computer system allows for data transfer. For film, scanning of images using a film scanner can be performed to produce digital data.

Figure 4:
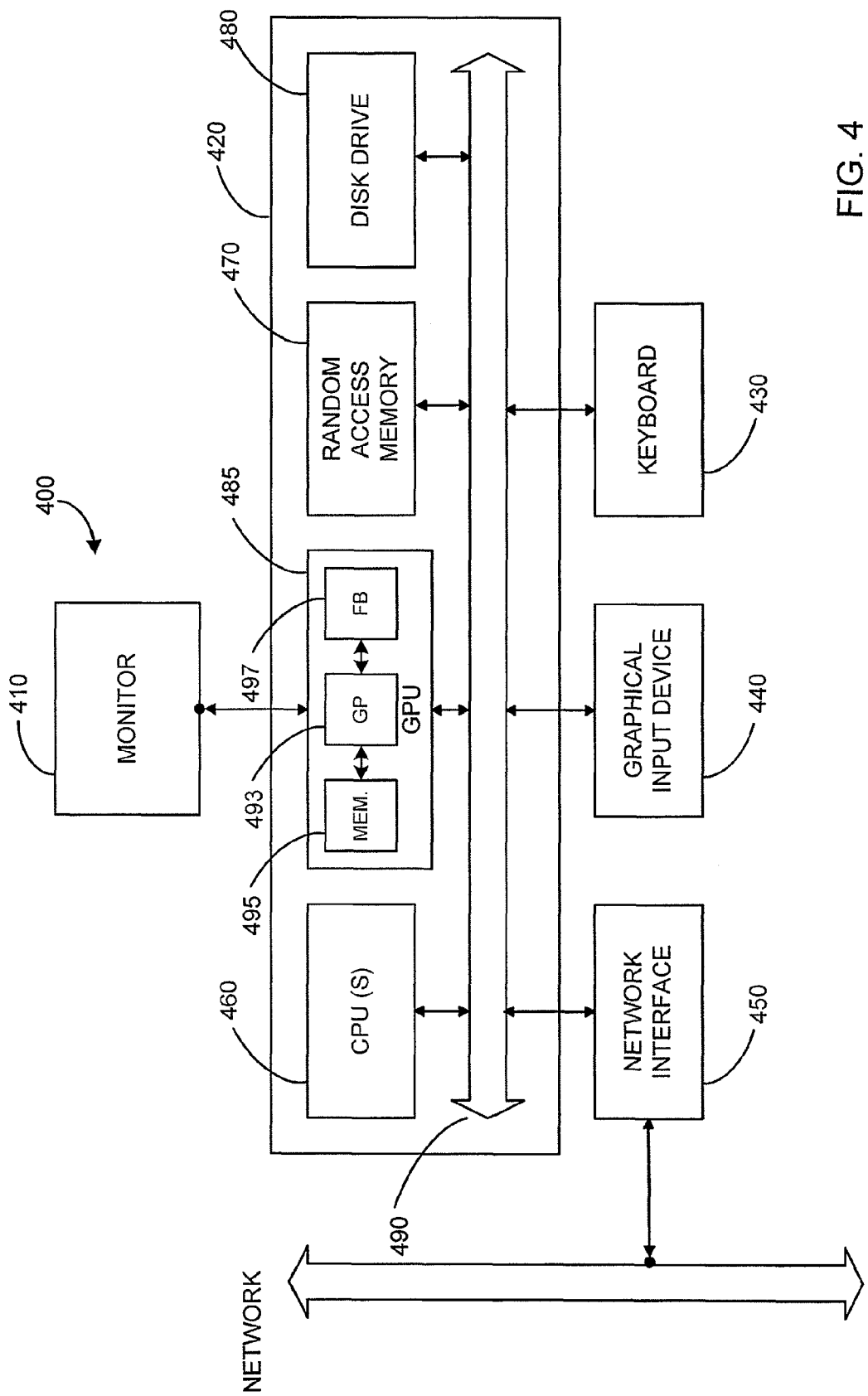
FIG. 4 is a block diagram of a computer system that may be used to practice embodiments of the present invention.

FIG. 4 is a block diagram of a computer system that may be used to practice embodiments of the present invention, in particular image data calibration (see below), data processing and image manipulation and rendering. FIG. 4 is merely illustrative of an embodiment incorporating the present invention and does not limit the scope of the invention as recited in the claims. One of ordinary skill in the art would recognize other variations, modifications, and alternatives.

In one embodiment, computer system 400 typically includes a monitor 410, computer 420, a keyboard 430, a user input device 440, computer interfaces 450, and the like.

In various embodiments, user input device 440 is typically embodied as a computer mouse, a trackball, a track pad, a joystick, wireless remote, drawing tablet, voice command system, eye tracking system, and the like. User input device 440 typically allows a user to select objects, icons, text and the like that appear on the monitor 410 via a command such as a click of a button or the like.

Embodiments of computer interfaces 450 typically include an Ethernet card, a modem (telephone, satellite, cable, ISDN), (asynchronous) digital subscriber line (DSL) unit, FireWire interface, USB interface, and the like. For example, computer interfaces 450 may be coupled to a computer network, to a FireWire bus, or the like. In other embodiments, computer interfaces 450 may be physically integrated on the motherboard of computer 420, and may be a software program, such as soft DSL, or the like.

In various embodiments, computer 420 typically includes familiar computer components such as a processor 460, and memory storage devices, such as a random access memory (RAM) 470, disk drives 480, a GPU 485, and system bus 490 interconnecting the above components.

In some embodiments, computer 420 includes one or more Xeon microprocessors from Intel. Further, in one embodiment, computer 420 includes a UNIX-based operating system.

RAM 470 and disk drive 480 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of useful tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 400 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 485 may be any conventional graphics processing unit that may be user programmable. Such GPUs are available from NVIDIA, ATI, and other vendors. In this example, GPU 485 includes a graphics processor 493, a number of memories and/or registers 495, and a number of frame buffers 497.

FIG. 4 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Figure 5A:
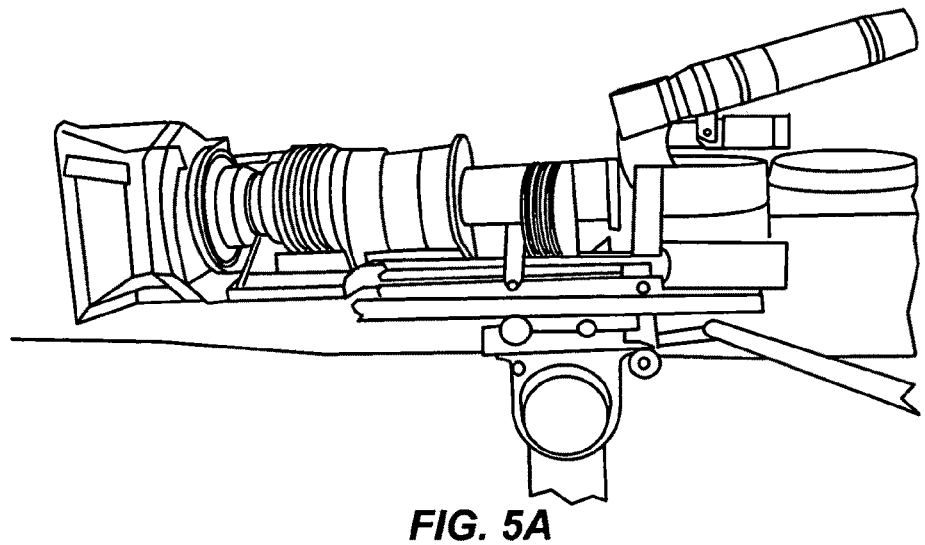
FIG. 5a shows a lens coupled with a film camera and FIG. 5b shows a lens coupled with a digital camera
Figure 5B:
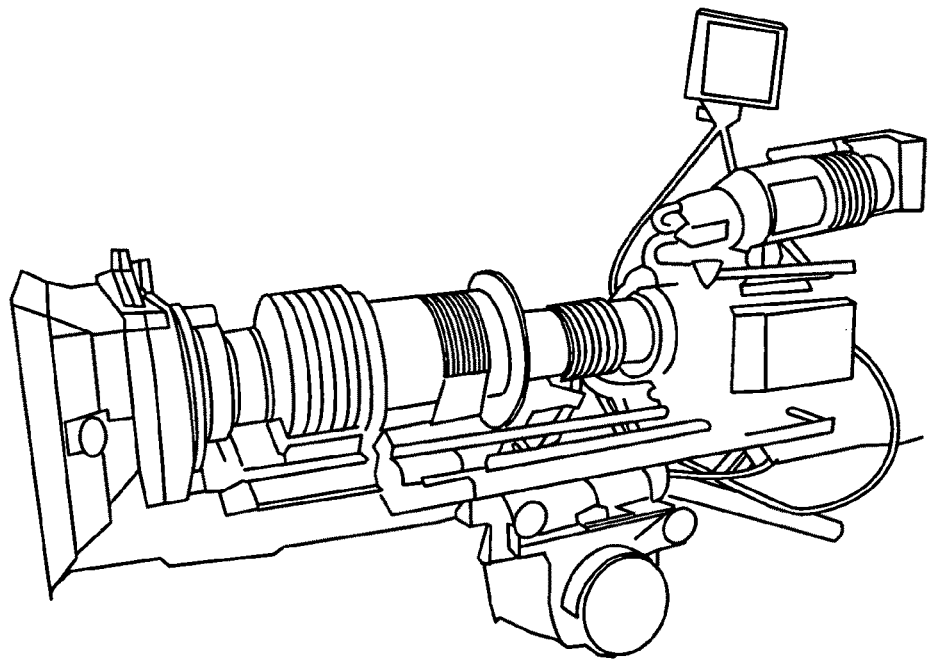

FIG. 5 illustrates two pictures of a lens according to one embodiment; FIG. 5a shows a lens coupled with a film camera and FIG. 5b shows a lens coupled with a digital camera.
Calibration A superplenoptic lens, such as disclosed herein, makes images using a lenslet array. Each image is a rectangular array of sub-images, one per lenslet. Pixels in the lenslets are indexed by 4-dimensional coordinates—2 dimensions to select a sub-image and 2 further coordinates to select pixels from the sub-images. In one embodiment, the pixel coordinates are taken to range from −½ to ½ across each sub-image, so the nominal size of the sub-image is 1×1, with its center at coordinate (0,0). Because the sub-images are indexed with integers, the 4 coordinates can be reduced down to 2 numbers by addition, so the integer parts of the 2-dimensional coordinates identifies the sub-image and the fractional parts (e.g., between −0.5 and 0.5) select pixels within sub-images.

To use images captured by a superplenoptic lens, it is necessary to map coordinates in lenslet space to coordinates in the image. The mapping can be approximated pretty well with an affine transformation, possibly combined with a radial distortion term. The calibration process approximates the lenslet-to-sensor mapping, starting with a frame captured by the superplenoptic camera. No special calibration target is required, any well-lit frame will do. The calibration procedure relies on the fact that due to vignetting by the lenslets, the sub-images are mostly bright in the middle and black near the corners.

In certain embodiments, an autocorrelation of the calibration image is first calculated. This value will be large at positions corresponding to multiples of the lenslet spacing (and at other points, due to noise). Peaks are extracted from the autocorrelation and a histogram of pairwise distances between the peaks is made. The first local maximum of the histogram (above a certain noise threshold) gives an estimate of the lenslet spacing. It should be appreciated that minima could also be used. Second, the estimated spacing is used as the filter width of a low-pass filter that is run over the original image. This blurs out all details within the lenslets, leaving (mostly) only bright spots centered on the lenslet centers. Another peak-detection pass selects candidate lenslet centers from the filtered image.

Next, the candidate list is culled; for each candidate, the number of neighboring points within a certain percentage (e.g., 20%) of the original lenslet spacing estimate is counted. If there are exactly 4 such neighbors, the candidate point is accepted. By walking the neighbor graph of the accepted points, a lenslet number is assigned to each. Finally, a least-squares fit of the lenslet-to-sensor mapping fitting is applied to the assigned lenslet numbers and measured locations of each acceptable candidate.

Figure 15:
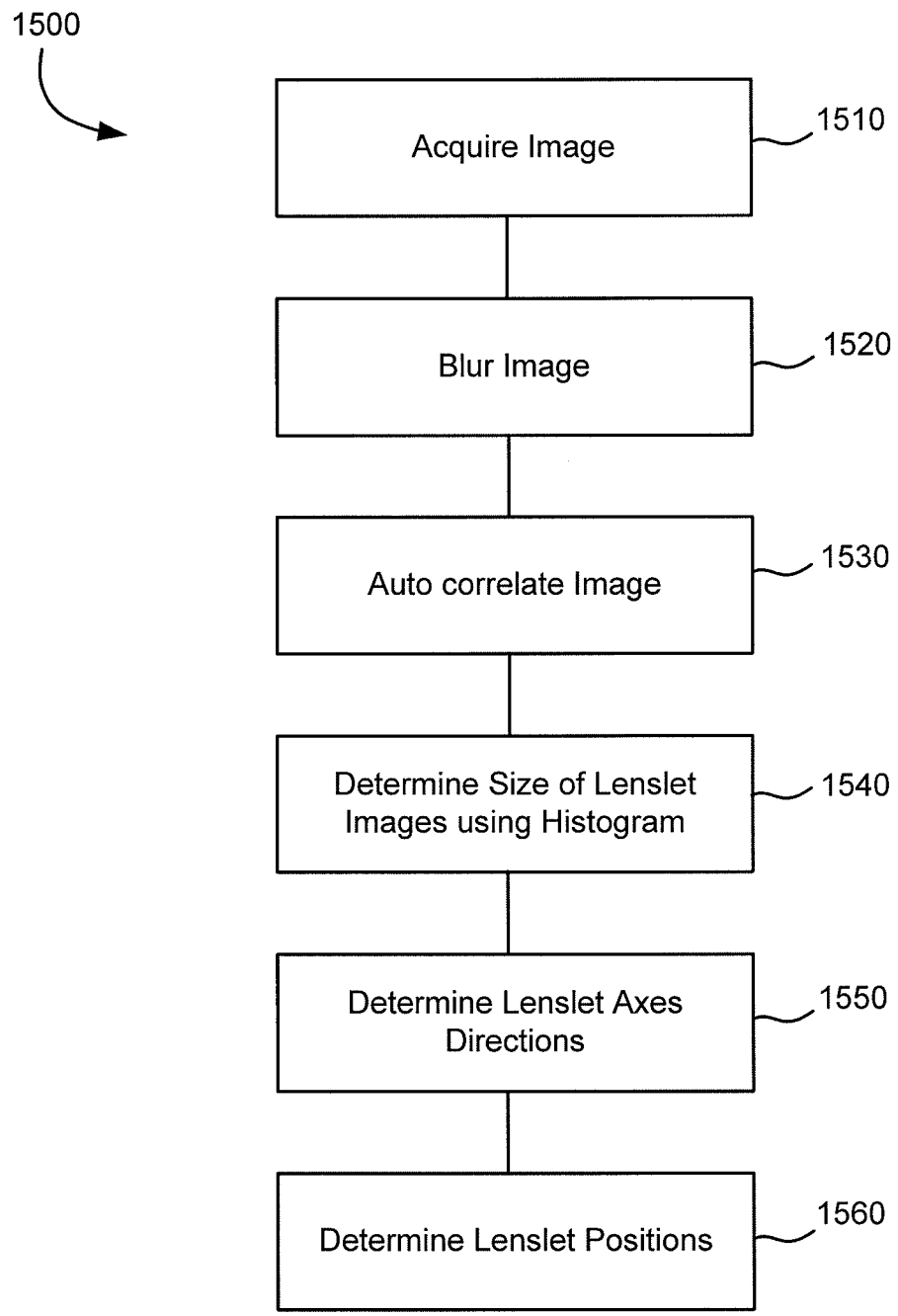
FIG. 15 shows a method of calibrating images according to one embodiment.
Figure 18:
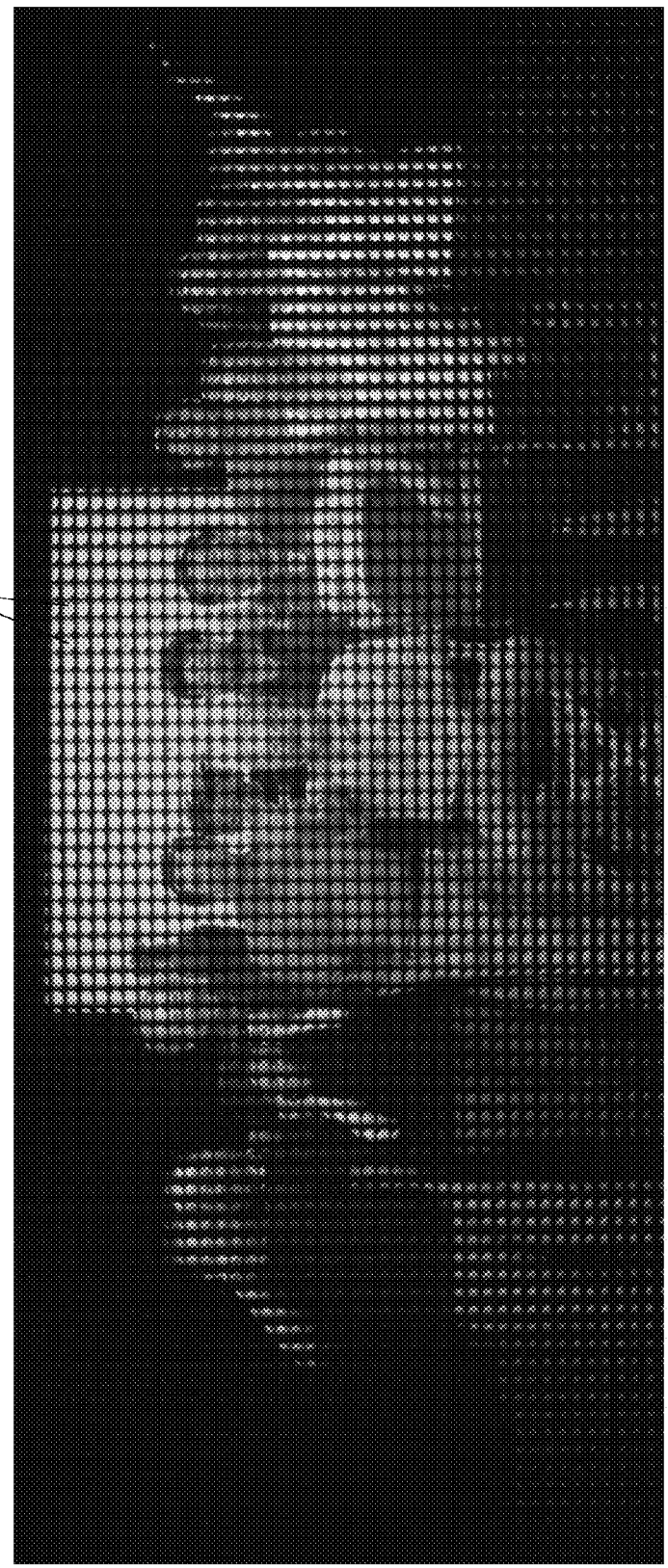
FIG. 18 illustrates an example of a lightfield image captured using a plenoptic lens.

As discussed above, in order to use the images taken using a plenoptic lens according to the embodiments described herein, it is desirable to calibrate the images to determine the locations and dimensions of the lenslet images within each image. According to one embodiment, a method 1500 of calibrating images is shown in FIG. 15. In step 1510, an image is acquired. The image acquired (e.g., lenslet image) includes an array or matrix of individual lenslet images. FIG. 18 illustrates an example of a light-field image captured using a plenoptic lens. As can be seen, the lightfield image includes a plurality of tiny images 1810 taken from different viewpoints.

Certain features of the image are sufficiently unknown that it is difficult to know the dimensions of each lenslet image. For example, the angle of the lenslet array relative to the image plane (sensor) is not known and the magnification of the relay lens is not sufficiently known. Even with robust components, the image plane angle may vary from shot to shot due to movement of the camera, for example, as the camera and components are not sufficiently rigid. For example, over a range of 20 pixel images, movement might be on the order of 0.5 pixels, whereas a 0.1 pixel or better resolution is generally needed. Also, the lenslet array may be canted relative to the image plane; the angular deviation of the lenslet array to the sensor array is typically on the order of 0.5 degrees or less. Therefore, the dimensions of the lenslet images are not sufficiently known.

In step 1530, an optional autocorrelation function is applied to auto-correlate the lenslet images to determine spacing parameters of the lenslet images. Generally, the autocorrelation function involves convolving the lenslet array image with itself; the image is correlated with itself at different offsets and it becomes desirable to identify the offset that lines up identical features in the various lenslet images. In certain embodiments, an a priori estimate of the lenslet spacing could be used in place of autocorrelation. In general, autocorrelation is used to determine what filter to use when filtering the field image to enhance the peaks. Hence, in one embodiment, a step of identifying a peak enhancement filter is performed before a step of filtering the field image, where autocorrelation is one way used to identify a peak enhancement filter.

In one embodiment, an optional blur filter is applied to the lenslet images at step 1520 before auto-correlation. This is done to remove detail from the images as detail in the images is not important for determining spacings, dimensions and locations of the lenslet images. Generally any blur filter may be used as no parameters need to be tuned.

Figure 16:
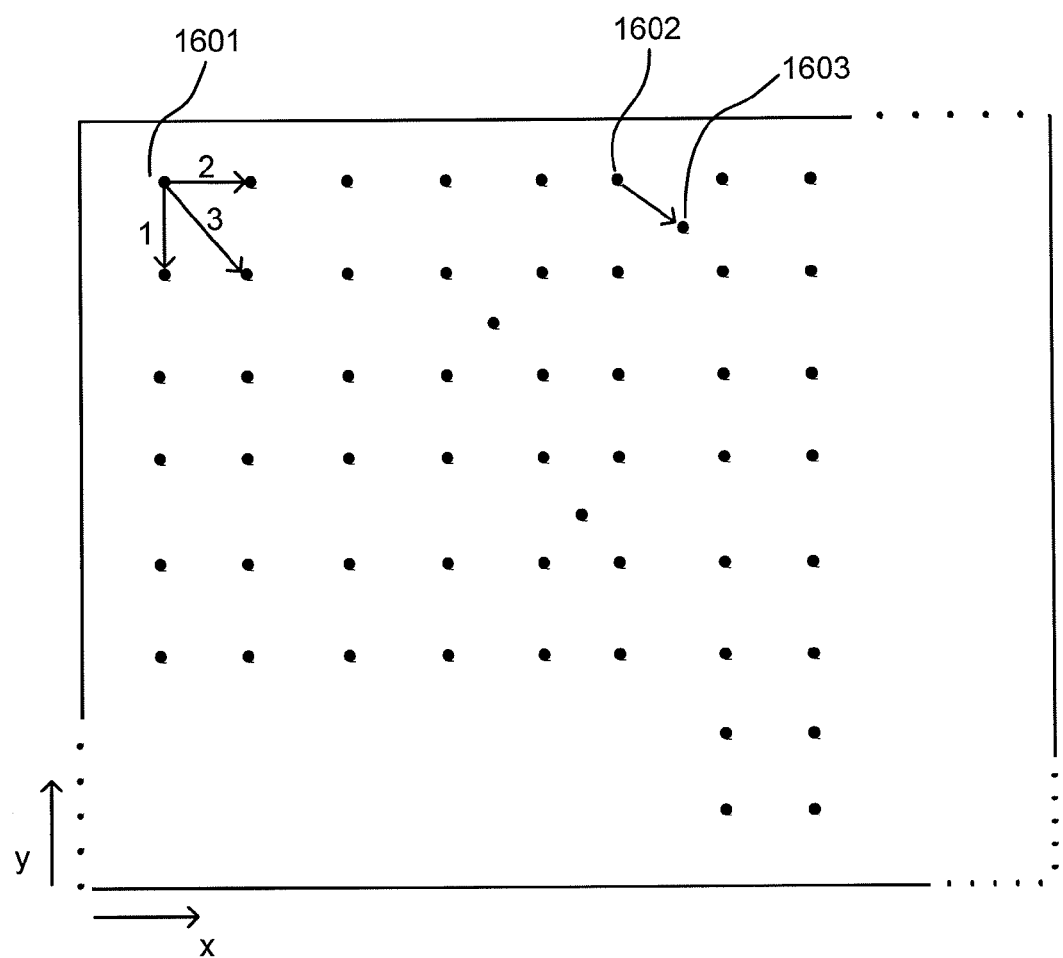
FIG. 16 shows an example of an autocorrelation image showing peaks or extrema.

The result of the autocorrelation step 1530 produces an image of regularly spaced spikes or peaks representing all possible offsets. An example of the autocorrelation image showing peaks is shown in FIG. 16. In step 1540, a histogram of inter-peak distances is created for all possible pairs of peaks (or a subset of all pairs of peaks). For example, a list of x and y coordinates for the peaks is created, and for each peak, a list of distances between all other peaks is determined. FIG.

Figure 17:
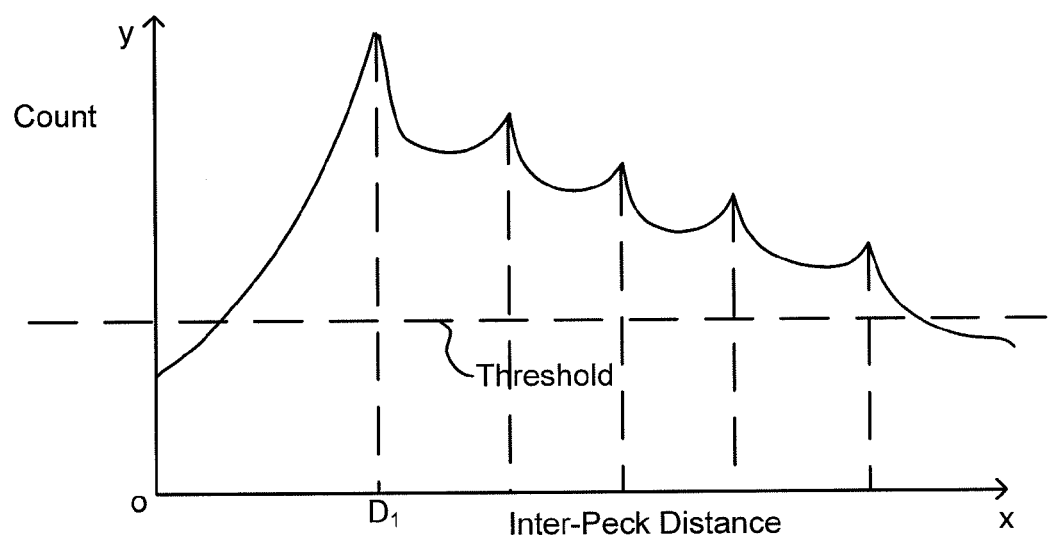
FIG. 17 shows an example of a histogram for the inter-peak distances.

16 shows distances for the three closest peaks to peak 1601. A histogram of inter-peak distances is then formed. An example of such a histogram is shown in FIG. 17. As can be seen, a series of histogram peaks results. Generally, the first histogram peak represents a good estimate of the lenslet size (e.g., the spacing between peaks represents a good estimate for the vertical and horizontal dimension of each lenslet image in the array). In general, there may be some noise, due to for example peaks such as peak 1603, in this case the inter-peak distance between peak 1602 and 1603 creates a noise count. If desired, in one embodiment, noise can be reduce by removing a portion of the data, for example removing all histogram peaks below a threshold value from the data. In certain aspects, the threshold value is set at a percentage (e.g., 5, 10 or 15 percent of the max histogram peak height).

In step 1550, directions of the lenslet images are determined. As above, the lenslet images may be canted relative to the image plane, e.g., by about 0.5 degrees or so. In one embodiment, the directions of vectors representing the closest peaks along x and y directions (based on the x-y coordinates of peaks) are sorted into two buckets and averages are taken of each bucket to determine average perpendicular inter-peak directions. Because the cant is typically less than 0.5 degrees, one bucket will generally consist of vectors having a predominant x component, and the other will consist of vectors having a predominant y component. Hence the average of each bucket provides an estimate of the directions between lenslet images.

In step 1560, the center positions of the lenslet images are determined. In one embodiment, this is done by first assuming that the corner is at the origin. All images are then added up, which typically results in a black spot oriented in the center of the composite image. The position of this spot relative to the corner can be used to determine the offset to determine the position of the corner of a lenslet image. Each center spot should have exactly 4 neighbors at correct distances in a matrix; lenslet coordinates can be assigned to each center (e.g., with an arbitrary coordinate assignment for the matrix origin) and a least squares fit can be used to obtain the calibration matrix.

It should be appreciated that the calibration methodologies described herein may be performed offline after image capture, or they may be performed in real time as images are being captured.

Calibration Function

One embodiment of a calibration function includes a simple affine transformation. That is, it is assumed that there is a linear relationship between lenslet coordinates and pixel coordinates. There are six parameters, (e.g., a, b, c, d, e, and f) such that if (x,y) is a point in lenslet space and (X,Y) is a point in pixel coordinates, then:

$$X = ax + by + c$$

$$Y = dx + ey + f$$

The least-squares optimization to find a, b, c, d, e, and f works as follows:
Given a bunch of pairs of corresponding points $$((X[i], Y[i]), (x[i], y[i])), 0 <= i < n$$

(those are the output of the first few phases of the calibration procedure), the total squared calibration error for the pairs is:

```
double error=0;
for(i=0;i<N;i++){
```

```
    double dx=a*x[i]+b*y[i]+c-X[i];
    double dy=d*x[i]+e*y[i]+f-Y[i];
    error+=dx*dx+dy*dy;
}
```

The optimization process calculates (a, b, c, d, e, and f) to minimize this error term. In certain aspects, Newton's method is used to find a zero of the gradient of the error. The same method works for any calibration function that is suitably continuous in its parameters.

In some cases, it may be desirable to correct for radial distortion of the relay lens as well. In this case, the calibration function can be made slightly more complex and a few more parameters can be added to be optimized. For example, in addition to the affine parameters (a, b, c, d, e, and f), there could be three more parameters (g, h, and j) that specify the center of the radial distortion and its intensity:

$$u = ax + by + c - g$$

$$v = dx + ey + f - h$$

$$r = 1 + j(u^2 + v^2)$$

$$X = ur + g$$

$$Y = vr + h$$

The affine part characterizes the shape and orientation of the lenslet array. The distortion part characterizes the relay lens. One can make more complicated radial distortion models by adding terms with higher even powers of $u^2+v^2$ (and corresponding extra parameters). In certain embodiments, j substantially equal to 0 and g and h are irrelevant, since they cancel out when j=0.

Collimated Pinholes

In certain aspects, it is desirable to be able to calibrate the camera using just whatever scene footage the camera crew shot as discussed above. In certain circumstances where that may be infeasible a flat white field can be used. In this case, the lenslets produce vignetted images of the field from which lenslet corners and centers can be easily located as discussed above. In another embodiment, a calibration image that puts a tiny spot at the center of each lenslet is used. One way to do that is to replace the field lens with an illuminated pinhole at the focal plane of a collimating lens. In this case, the order of the elements in the assembly would be Light source
Pinhole
Collimator
Lenslet array
Relay lens
Sensor The effect is to project the image of the pinhole out to infinity. This configuration sends a bundle of parallel rays to the lenslet array, which will focus the rays at the lenslet centers (if the pinhole is carefully centered to start with.) Then, the lenslet centers can be located to sub-pixel precision by computing the centroids of the projected pinhole images. Either target choice (flat field or collimated pinhole) allows for a list of candidate lenslet locations to be obtained, which can be used to drive the rest of the calibration process.

Depth Estimation

After acquisition of raw frames from the plenoptic camera, the images are processed to densely recover depth in the original scene. For the sake of this description, consider that each lenslet image consists of a square n×n matrix of pixel values. If a corresponding pixel is extracted from each of the lenslet images and they are arranged as an image, n×n images of the original scene can be produced, each imaged from a particular different position on the main field lens. Because these images are obtained from a precision, calibrated screen of precisely determined dimension, the relative world space shifts in viewpoint between all these virtual images are known. This reduces the dimensionality of the search needed to be performed relative to other less constrained multiple view stereo algorithms. Instead of recovering individual camera positions for each of the n×n cameras, one can solve for their median position.

After recovering the camera position, depth can be determined by directly measuring the disparity of each pixel in the image, and from the disparity and the world space coordinate information, the relative depth of each pixel can be determined. Super-resolution techniques are then used to combine all of the images back together along with depth information, and generate a layered depth image which can be used by more conventional compositing tools that implement depth-based compositing.

Figure 8:
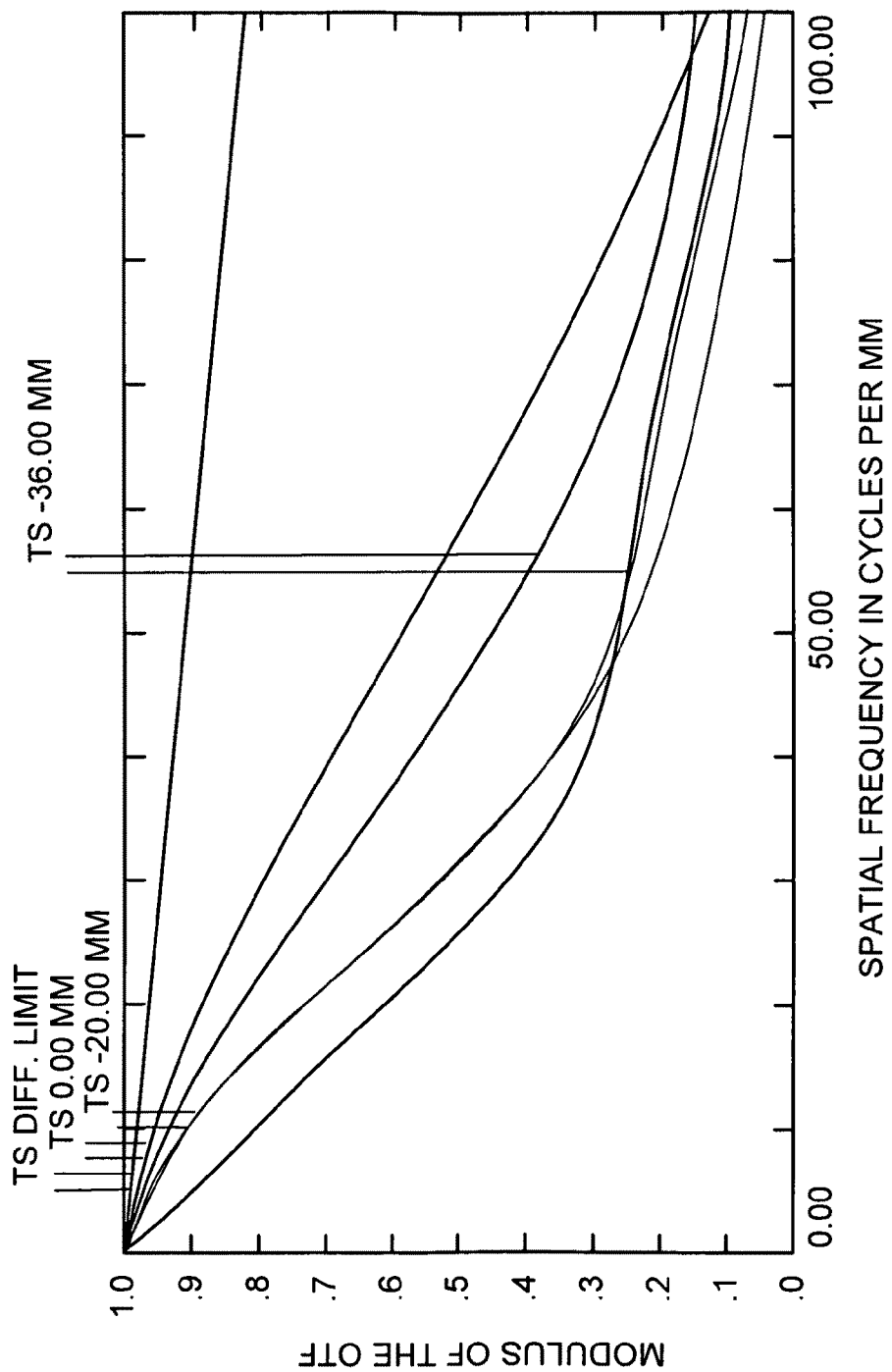
FIG. 8 shows a Polychromatic Diffraction MTF (Modulation Transfer Function) for a super plenoptic lens.
Figure 9:
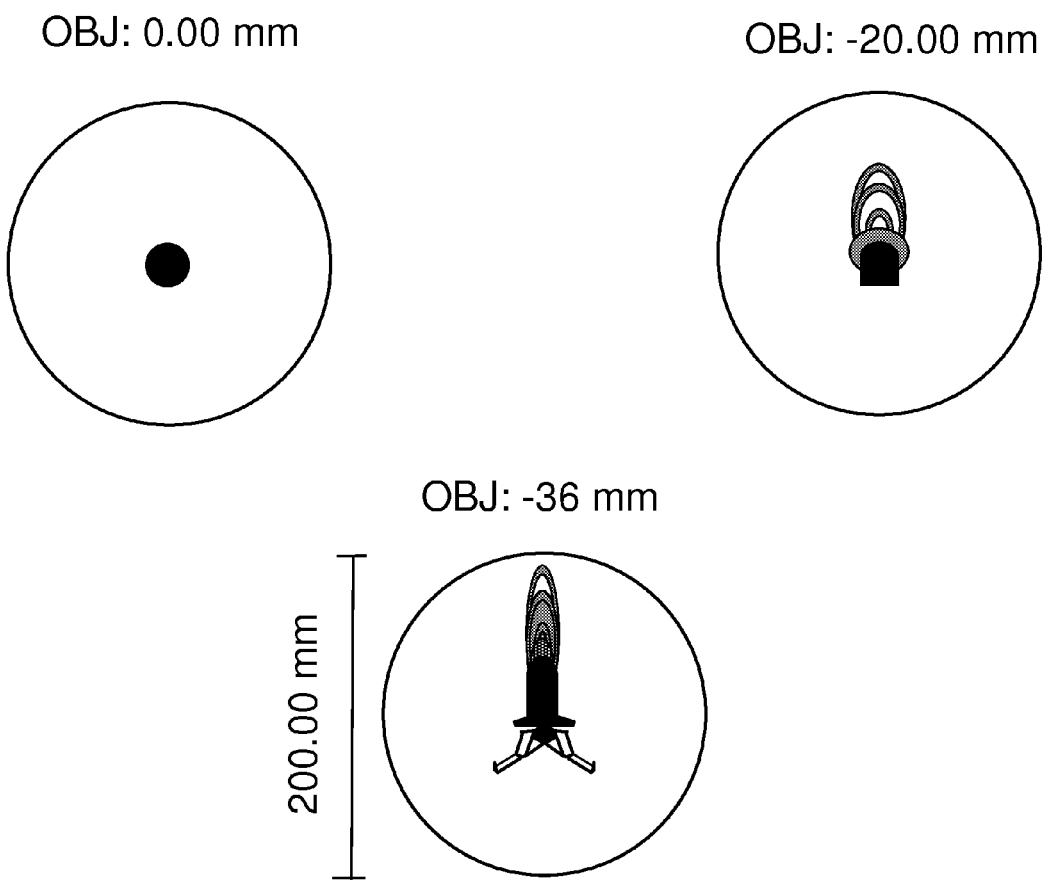
FIG. 9 illustrates a spot diagram for a super plenoptic lens.
Figure 10:
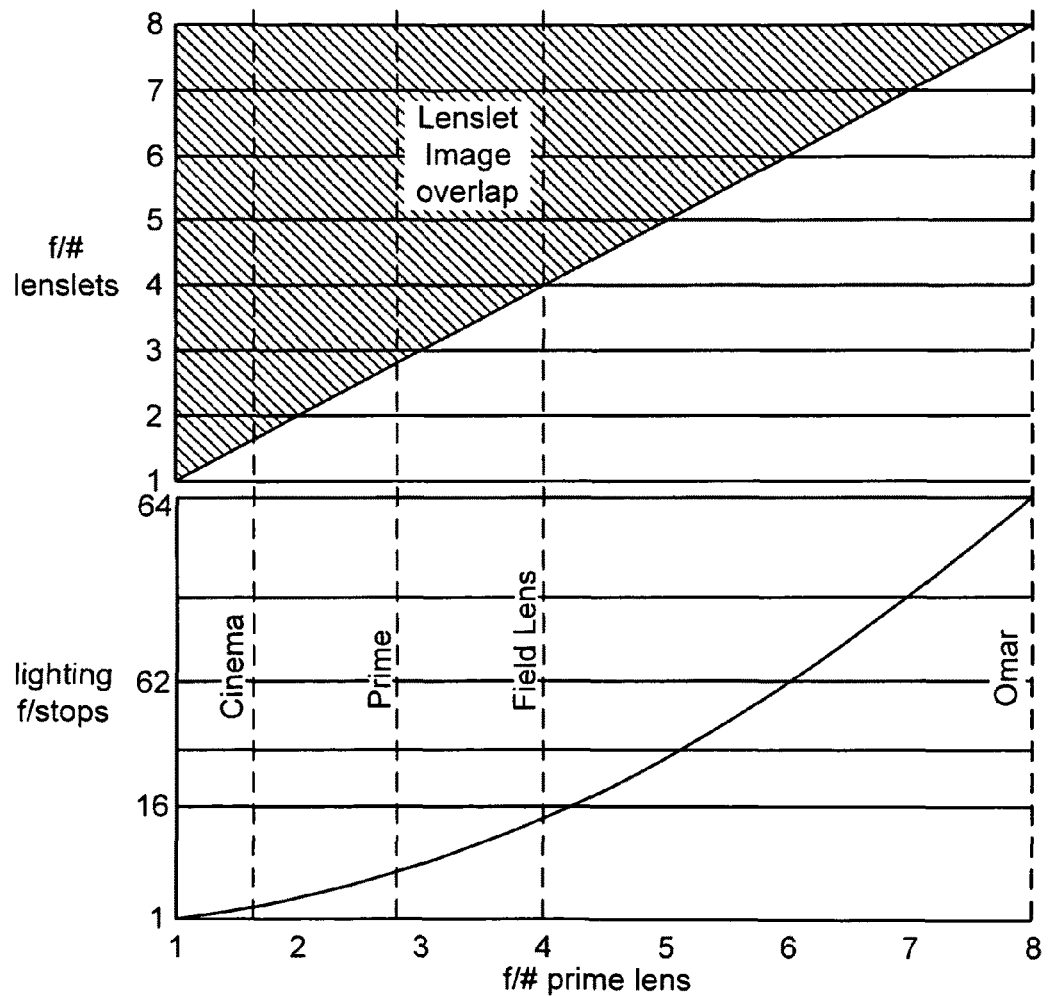
FIG. 10 illustrates a graph of Lens f# vs. Lenslet f# vs. f-stops of a Prime lens.
Figure 11:
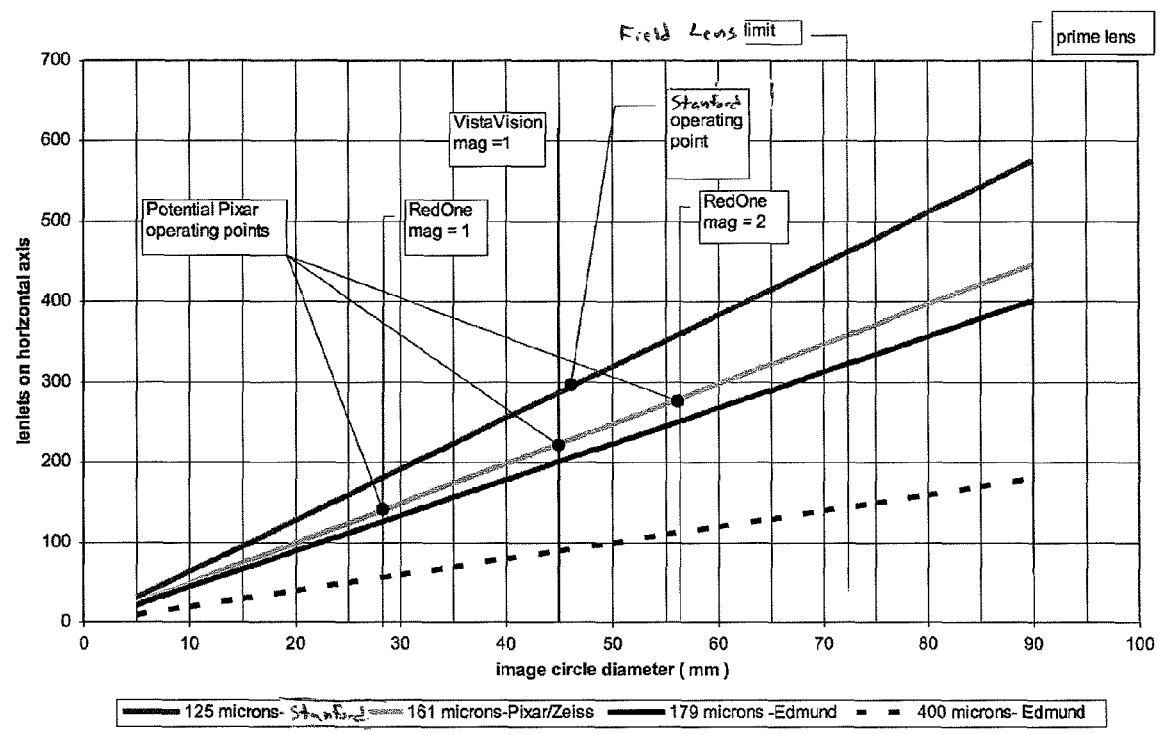
FIG. 11 illustrates a graph of lenslets vs. image circle diameter for various light field cameras.
Figure 13:
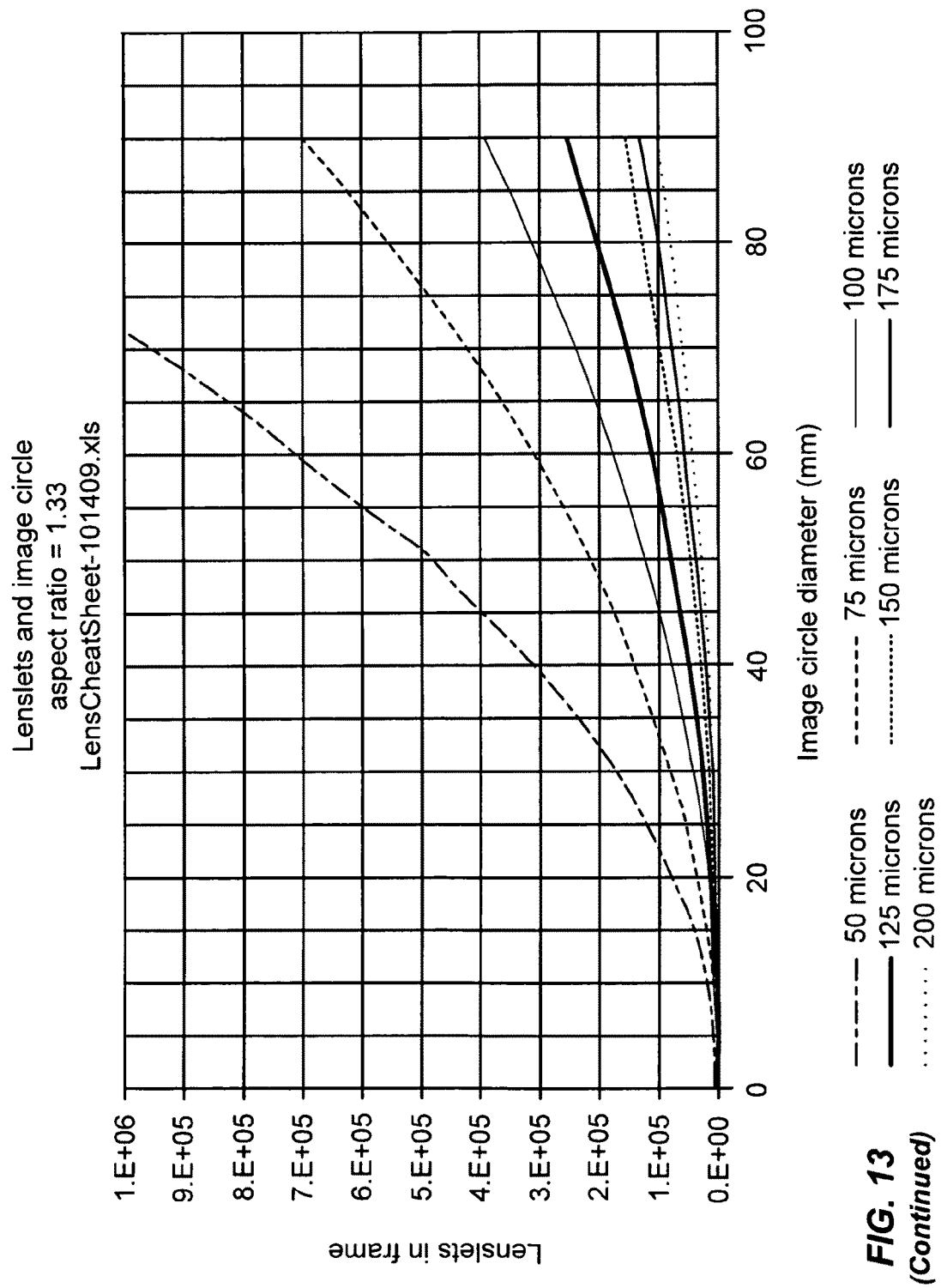
FIG. 13 shows lenslet vs. image circle metadata for the lens of FIG. 7.

FIGS. 8-14 show various performance parameters for superplenoptic lens components. FIG. 8 shows a Polychromatic Diffraction MTF (Modulation Transfer Function) for a super plenoptic lens. FIG. 9 illustrates spot diagrams for a super plenoptic lens for three different field positions (with object distances from the optical axis being 0.0, −20.00 mm, and −36 mm, respectively). FIG. 10 illustrates a graph of Lens f# vs. Lenslet f# vs. f-stops of a Prime lens and FIG. 11 illustrates a graph of lenslets vs. image circle diameter for various light field cameras. FIG. 12 illustrates image circle metadata for a superplenoptic lens as shown in FIG. 7, and FIG. 13 shows lenslet vs. image circle metadata for the lens of FIG. 7. FIG. 14 shows data for various motion picture prime lenses.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for plenoptic photography, the system comprising:
   a) a lenslet array;
   b) a sensor element positioned at a distance from the lenslet array; and
   c) a field lens and focusing optics positioned between the lenslet array and the sensor element, wherein the field lens is configured to gather light refracted from the lenslet array, and the focusing optics is configured to focus the gathered light on to the sensor element, thereby forming a plurality of lenslet images on the sensor element, with each lenslet image corresponding to a lenslet in the lenslet array;
   wherein the position of the lenslet array relative to the field lens is adjustable.

2. The system of claim 1, further including a prime lens positioned in front of the lenslet array to focus light onto the lenslet array.

3. The system of claim 2, wherein the prime lens includes one of a fixed-focal-length lens or a zoom lens.

4. The system of claim 1, wherein the sensor element includes one of a CCD sensor or a CMOS sensor or photographic film.

5. The system of claim 1, wherein the sensor element includes a camera housing that holds a sensor.

6. The camera of claim 1, wherein the distance between the sensor element and the lenslet array is greater than 30 mm.

7. A plenoptic camera, comprising:
   a prime lens having a focal plane;
   a lenslet array positioned proximal to the focal plane;
   a field lens positioned after the lenslet array and configured to gather light refracted by the lenslet array;
   focusing optics positioned after the field lens and configured to focus the gathered light onto an image plane, thereby forming a plurality of lenslet images on the image plane, with each lenslet image corresponding to a lenslet in the lenslet array; and
   a sensor positioned at the image plane;
   wherein the position of the lenslet array relative to the field lens is adjustable.

8. The camera of claim 7, wherein the F-number of the prime lens is larger than or equal to the F-number of the lenslet array.

9. The camera of claim 7, wherein the sensor includes one of a CCD sensor or a CMOS sensor or photographic film.

10. The camera of claim 7, wherein the distance between the sensor and the lenslet array is greater than 30 mm.

11. The camera of claim 7, wherein the distance between the sensor and the lenslet array is between 30 mm and 300 mm.

12. The camera of claim 7, wherein the prime lens includes one of a fixed-focal-length lens or a zoom lens.

13. A plenoptic lens comprising:
   a prime lens having a focal plane;
   a lenslet array for receiving light from the prime lens and positioned proximal the focal plane;
   focusing optics positioned after the lenslet array;
   a field lens positioned between the lenslet array and the focusing optics, wherein the field lens is configured to gather light refracted by the lenslet array, and the focusing optics is configured to focus the gathered light onto an image plane, thereby forming a plurality of lenslet images on the image plane, with each lenslet image corresponding to a lenslet in the lenslet array; and
   wherein the position of the lenslet array relative to the field lens is adjustable.

14. The lens of claim 13, further including a housing structure that holds the prime lens, the lenslet array, the focusing optics and the field lens together.

15. The lens of claim 14, wherein the housing structure is adapted to mate with a lens mount on a camera such that the image plane coincides substantially with a sensor of the camera.

16. The lens of claim 15, wherein the camera is one of a digital still photo camera, a digital motion picture camera, a photographic motion picture camera or a photographic film camera.

17. The lens of claim 14, wherein the housing structure includes a lens barrel.

18. The lens of claim 13, wherein the prime lens includes one of a fixed-focal-length lens or a zoom lens.

* * * * *